J. CLARK.

RAILROAD TIE.

No. 10,504. Reissued Aug. 5, 1884.

WITNESSES:

Fr. N. Rosenbaum

Sibley Mann

INVENTOR

Joseph Clark

BY

Goepel & Raegener

ATTORNEYS.

UNITED STATES PATENT OFFICE.

JOSEPH CLARK, OF BBOOKLYN, NEW YORK.

RAILROAD-TIE.

SPECIFICATION forming part of Reissued Letters Patent No. 10,504, dated August 5, 1884.

Original No. 256,199, dated April 11, 1882. Application for reissue filed April 12, 1884.

DIVISION A.

*To all whom it may concern:*

Be it known that I, JOSEPH CLARK, of Brooklyn, in the county of Kings and State of New York, have invented certain new and useful Improvements in Railroad-Ties; and I do hereby declare the following to be a full, clear, and exact description of the invention, that will enable others skilled in the art to which it appertains to make and use the same, reference being had to the accompanying drawings, and to the letters of reference marked thereon, which form a part of this specification.

This invention has reference to improvements in the metallic railroad-tie for which Letters Patent have been granted to me, numbered 249,503, and dated November 15, 1881, so that the tie can be manufactured in a cheaper manner, applied with equal facility to the body and joint of the rails, and that the latter can be more readily adjusted laterally for the normal width of the track.

The invention consists of a flanged base-plate and of two separate arched bearing-plates having depressed chairs for the rails, with means whereby the bearing-plates are adjustably connected to the flanges of the base-plate, so as to admit the adjustment of the rails closer to or farther from each other. The base of the rail is secured to the seats of the bearing-plates by means of clasps, which are secured tightly around the seat and base of the rail, while the rail-joint is secured by springing the middle portions of the angular fish-plates at opposite sides of the rails into the arched bearing-plate.

Figure 1:
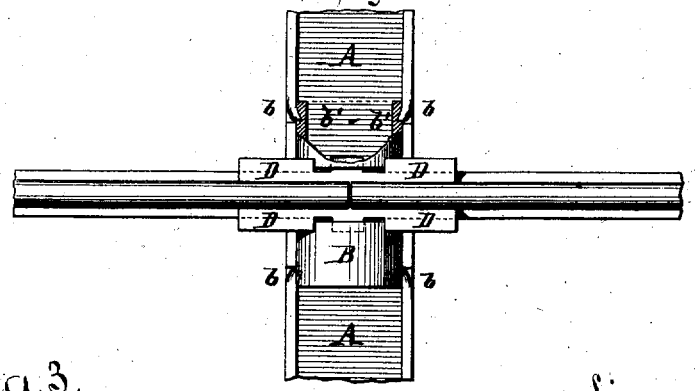
Figure 3:
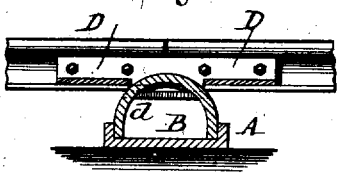
Figure 4:
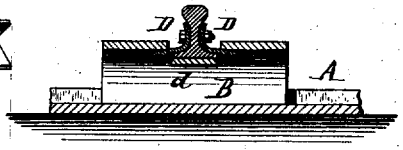
Figure 2:
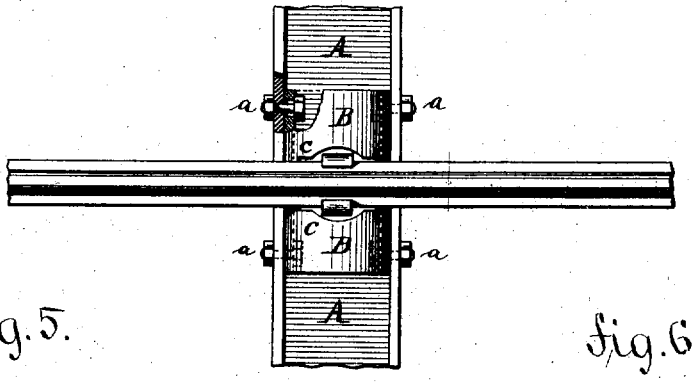
Figure 5:
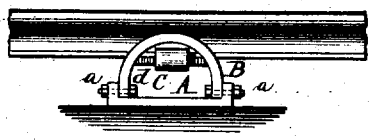
Figure 6:
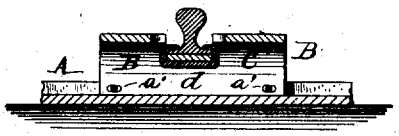

In the accompanying drawings, Figure 1 represents a plan view, partly in section, of my improved metallic railroad-tie, shown as arranged for supporting a rail-joint. Fig. 2 is a plan view, also partly in section, of a tie supporting the rail at an intermediate point. Figs. 3 and 4 are respectively an end view of a rail-joint, the tie being shown in section, and a vertical longitudinal section of the tie and joint shown in Fig. 1. Figs. 5 and 6 are an end view and a vertical longitudinal section of the tie shown in Fig. 2, and Fig. 7 is a perspective view of the angular fish-plate employed for securing the rail-joint to the tie.

Similar letters of reference indicate corresponding parts.

Referring to the drawings, A represents the flanged or channeled base-plate, and B the arched bearing-plates, of my improved metallic railroad-tie. Each bearing-plate B extends a certain distance at both sides of the rail, and is secured to the flanges of the base-plate, either by means of screw-bolts *a*, which pass through transverse slots *a'*, near the lower ends of the arched bearing-plate B, as shown in Fig. 2; or the flanges of the base-plate A may be provided with inwardly-drawn portions *b*, which project into recesses *b'* of the bearing-plate B, the object in either case being to admit a slight lateral adjustment of the bearing-plate B on the base-plate A, for setting the rail to the exact normal width of the track. The bearing-plates B are provided at the points where the rails cross the same with depressed chairs *d*, which are formed by punching parallel slits into the flat blank of the bearing-plate B, and crowding or bumping the portion between the slits downward after the arched shape has been imparted to the bearing-plate. The rails are retained on the chairs *d* by means of clamps C, which pass around the bottom of the chair *d* and overlap the base of the rail at both sides, as shown clearly in Figs. 2 and 6, the clamp being first bent at one end and placed in position on the rail and chair, and then bent up, by means of a cross-bar or other implement, at the opposite end and applied tightly to the base of the rail.

Figure 7:
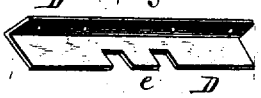

When a rail-joint is to be supported on the arched bearing-plate B, angular fish-plates D are used, the outwardly-projecting flanges of which are recessed at their middle portion, as shown in Fig. 7, so as to form tongue-shaped pieces *e*, which, when sprung below the arch of the bearing-plate, as shown in Fig. 4, will tightly secure the rail ends to the chair *d* of each bearing-plate B. The improved tie admits of the lateral adjustment of the rails for the normal width of the track, furnishes a simple connection of the rail and rail-joint with the chairs of the bearing-plates, and complies thus in more perfect manner with the requirements of a good metallic rail-tie.

I am aware that rails have been secured by clamps to depressed seats of pot-shaped sleepers or bearing-plates, and I therefore do not claim this feature broadly.

Having thus described my invention, I claim as new and desire to secure by Letters Patent—

1. In a metallic railroad-tie, the combination of the flanged base-plate A and of two separate arched bearing-plates, B B, with means whereby the latter are adjustably connected to the flanges of the base-plate, so as to be capable of lateral adjustment for setting the rails to the normal width of the track, substantially as specified.

2. In a metallic railroad-tie, the combination, with a flanged base-plate, A, and an arched bearing-plate, B, having a depressed chair, *d*, of a clamp, C, extending around the bottom of the chair and over the base of the rails, at both sides of the same, substantially as set forth.

3. In a metallic railroad-tie, the combination of the flanged base-plate A and an arched bearing-plate, B, having a depressed chair, *d*, formed in one piece therewith, with a rail-joint having angular fish-plates D, which are recessed at the middle portions of their outwardly-projecting parts, so as to form tongues *e*, which are sprung into the arched bearing-plate, substantially as set forth.

In testimony whereof I have affixed my signature in presence of two witnesses.

JOSEPH CLARK.

Witnesses:

LOUIS C. RAEGENER,

SIDNEY MANN.